United States Patent
Haugaard et al.

(10) Patent No.: US 6,379,027 B1
(45) Date of Patent: Apr. 30, 2002

(54) LIGHT-GENERATING AND BEAM-ESTABLISHING DEVICE

(75) Inventors: Eric J. Haugaard, Kenosha; Craig Raleigh, Saukville, both of WI (US)

(73) Assignee: Ruud Lighting, Inc., Racine, WI (US)

( * ) Notice: Subject to any disclaimer, the term of this patent is extended or adjusted under 35 U.S.C. 154(b) by 0 days.

(21) Appl. No.: 09/568,210

(22) Filed: May 9, 2000

Related U.S. Application Data

(63) Continuation-in-part of application No. 09/539,652, filed on Mar. 30, 2000, now Pat. No. 6,302,571.

(51) Int. Cl.[7] .............................. F21V 15/02; F21V 17/00
(52) U.S. Cl. ..................... 362/362; 362/267; 362/304; 362/376; 362/433
(58) Field of Search .............................. 362/267, 298, 362/302, 304, 306, 362, 364, 369, 376, 378, 433

(56) References Cited

U.S. PATENT DOCUMENTS

| | | | |
|---|---|---|---|
| 1,800,078 A | * 4/1931 | Johnson | 362/267 |
| 3,594,566 A | 7/1971 | Kneisley | 362/268 |
| 3,848,119 A | 11/1974 | Masson et al. | 362/33 |
| 4,012,630 A | 3/1977 | Gareis | 362/582 |
| 4,064,425 A | 12/1977 | Masson | 362/33 |
| 4,151,582 A | 4/1979 | Grunberger | 362/31 |
| 4,165,496 A | 8/1979 | Di Domenico, Jr. et al. | 372/31 |
| 4,344,110 A | 8/1982 | Ruediger | 362/560 |
| 4,428,031 A | 1/1984 | Mori | 362/576 |
| 4,463,986 A | 8/1984 | Sodder, Jr. et al. | 299/1.05 |
| 4,646,214 A | * 2/1987 | Mendleski | 362/362 |
| 4,799,137 A | 1/1989 | Aho | 362/309 |
| 4,865,417 A | 9/1989 | Naohiro et al. | 385/123 |
| 4,885,732 A | 12/1989 | Sunagawa et al. | 369/44.23 |
| 4,890,208 A | 12/1989 | Izenour | 362/294 |
| 4,911,516 A | 3/1990 | Palfrey et al. | 385/37 |
| 4,933,813 A | 6/1990 | Berger | 362/2 |
| 4,954,930 A | 9/1990 | Maegawa et al. | 362/26 |
| 4,994,946 A | 2/1991 | NakaMats | 362/282 |
| 5,005,108 A | 4/1991 | Pristash et al. | 362/31 |
| 5,043,850 A | 8/1991 | Dreyer, Jr. | 362/26 |
| 5,050,047 A | 9/1991 | Viner et al. | 362/552 |
| 5,064,276 A | 11/1991 | Endo et al. | 349/64 |
| 5,079,675 A | 1/1992 | Nakayama | 362/31 |
| 5,097,395 A | 3/1992 | Aho et al. | 362/551 |
| 5,126,923 A | 6/1992 | Hall, II | 362/35 |
| 5,130,908 A | 7/1992 | Simon | 362/150 |
| 5,233,679 A | 8/1993 | Oyama | 385/146 |
| 5,243,507 A | * 9/1993 | Atkins et al. | 362/376 |
| 5,276,592 A | 1/1994 | Henkes | 362/517 |
| 5,365,412 A | 11/1994 | Koppolu et al. | 362/518 |
| 5,408,397 A | * 4/1995 | Tyson | 362/267 |
| 5,416,669 A | * 5/1995 | Kato et al. | 362/304 |
| 5,483,427 A | 1/1996 | Dealey, Jr. et al. | 362/485 |
| 5,897,201 A | 4/1999 | Simon | 362/268 |
| 5,915,823 A | 6/1999 | Simon | 362/551 |
| 6,045,250 A | 4/2000 | Simon | 362/576 |

\* cited by examiner

Primary Examiner—Alan Cariaso
(74) Attorney, Agent, or Firm—Jansson, Shupe & Munger, Ltd.

(57) ABSTRACT

A light-generating and beam-establishing device including a cage having first and second cage members, having a wall defining a light opening surrounded by an annular washer-engaging surface, a pair of light-gathering/directing elements in end-to-end relationship at inlet ends and having outlet ends each of which is aligned with one of the washer-engaging surfaces, a lamp between the inlet ends, and a spring washer between and engaging the outlet end of each of the light-gathering/directing elements and the corresponding washer-engaging surfaces. The cage members are secured together with the light-gathering/directing elements and spring washers sandwiched therebetween.

20 Claims, 5 Drawing Sheets

LIGHT-GENERATING AND BEAM-ESTABLISHING DEVICE

This application is a continuation-in-part of Ser. No. 09/539,652, filed on Mar. 30, 2000 now U.S. Pat. No. 6,302,571.

FIELD OF THE INVENTION

The present invention relates to lighting apparatus and, more particularly to light-generating and beam-establishing devices for use in lighting apparatus.

BACKGROUND OF THE INVENTION

A wide variety of lighting devices have been used for generating light to illuminate particular target areas or other limited areas.

A number of problems and shortcomings exist with respect to certain kinds of lighting apparatus for illuminating limited target areas. Examples of prior art devices for this purpose include the structures disclosed in U.S. Pat. Nos. 5,130,908, 5,915,823, 5,897,201 and 6,045,250, issued to Jerome H. Simon. Such devices have light-generating and beam-establishing structures which are large and bulky, rather than compact and efficient in the use of space. For this reason, the entire lighting apparatus tends to be larger and more bulky than is sometimes desirable, and these qualities may limit the usefulness of such devices. Compactness and efficiency in a light-generating and beam-establishing device are matters of particular importance in a number of lighting applications.

A number of important advances have recently been made in light-generating and beam-establishing devices for lighting apparatus, and in the lighting apparatus which utilize such devices. Attention is directed in particular to the following patent documents which are co-pending and commonly-owned with the instant patent. Such co-pending patent documents include the following: Ser. No. 09/454,073, filed Dec. 2, 1999, entitled "Efficient Arrangement For Coupling Light Between Light Source And Light Guide"; Ser. No. 09/470,156, filed Dec. 22, 1999, entitled "Method of Making Optical Coupling Device"; and Ser. No. 09/565,257, filed May 5, 2000, entitled "Efficient Directional Lighting System," all such applications having been filed by Juris Sulcs, John M. Davenport and Roger F. Buelow II. Another such co-pending and commonly-owned patent application is Ser. No. 09/568,209, filed May 9, 2000, entitled "Lighting Apparatus For Illuminating Well-Defined Limited Areas," such application having been filed by Alan J. Ruud, Roger F. Buelow II, John M. Davenport, Eric J. Haugaard and Juris Sulcs.

In utilizing such technology, protection of fragile parts and dimensional and tolerance considerations are of particular importance. Protection of fragile parts may be a problem, particularly if inexpensive manufacturing methods are desirable to facilitate profitable mass marketing. Fragile quartz light gathering/directing elements and light sources have to be held in specific spatial relationships with supporting parts and must tolerate significant shipment and handling stresses and significant heat stresses during use. Furthermore, it is important for low-cost manufacturing and reliable operation that tolerances not be too strict and that normal tolerances be readily accommodated in assembly and operation. Manufacturing variations and assembly misalignments should also preferably be accommodated, if at all possible.

Another problem which can be accounted is light loss which occurs, including in light-generating and beam-establishing devices. Light-loss considerations can tend to be particularly prevalent with respect to devices for illuminating limited areas. When directed light is aimed at a downstream device for further transmission toward a target, it is particularly important that all or virtually all of the light be received by the downstream device. Thus, close spacing can sometimes be of significant importance. Some of the above problems and considerations may be particularly difficult in situations where plural beams are generated with a single light source.

Producing and maintaining directed light beams having light of consistent high quality is a continuing need in the lighting industry. Another need is to provide readily serviceable lighting apparatus and easily replaceable light-generating and beam-establishing devices.

It is to dealing with the aforementioned problems and concerns that the present invention is directed.

OBJECTS OF THE INVENTION

It is an object of the present invention to provide an improved light-generating and beam-establishing device which overcomes certain problems of the prior art while delivering important advantages.

Another object of this invention is to provide an improved light-generating and beam-establishing device for use in lighting apparatus which illuminates selected limited areas Another object of this invention is to provide an improved light-generating and beam-establishing device of compact size.

Another object of this invention is to provide an improved light-generating and beam-establishing device which enhances the serviceability of certain types of lighting apparatus by facilitating replacement of the light-generating device.

Another object of this invention is to provide an improved light-generating and beam-establishing device which protects fragile elements during the stresses of shipping and handling and thermal stresses during operation.

Another object of this invention is to provide an improved light-generating and beam-establishing device which protects fragile elements despite non-rigorous tolerances in part manufacturing and assembly.

Another object of this invention is to provide an improved light-generating and beam-establishing device which accommodates misalignments without significant decreases in lighting efficiency or unacceptable light losses.

Another object of this invention is to provide an improved light-generating and beam-establishing device which provides directed light of consistent high quality.

Yet another object of the invention is to provide an improved multi-beam light-generating and beam-establishing device with single light which exhibits high efficiency in light usage.

These and other objects of the invention will be apparent from the invention disclosure which follows.

SUMMARY OF THE INVENTION

This invention is an improved light-generating and beam-establishing device for lighting apparatus which provides many advantages and overcomes various problems and shortcomings in the art, including those described above. The invention provides a versatile light-generating device versatility in application.

The device of this invention includes: (1) a cage having first and second cage members, each of which has a wall defining a light opening surrounded by an inwardly-facing annular washer-engaging surface; (2) a pair of light-gathering/directing elements within the cage, each having an inlet end in end-to-end relationship with the inlet end of the other light-gathering/directing element and an outlet end aligned with one of the washer-engaging surfaces; (3) a lamp between the inlet ends of the light-gathering/directing elements; and (4) a spring washer between and engaging the outlet end of each of the light-gathering/directing elements and the corresponding washer-engaging surface. The first and second cage members are secured together with the light-gathering/directing elements and spring washers sandwiched therebetween.

The inventive light-generating and beam-establishing device provides a number of important advantages. For example, the device reliably mounts a pair of fragile light-gathering/directing elements (or in some cases one such element), securely holding them in place despite shipping and handling shocks. The invention also accommodates significant manufacturing and assembly variations, misalignments and thermal stresses, protecting the fragile component parts. These advantages are provided even when broad tolerances are allowed for manufacturing components.

Furthermore, the device of this invention allows proper close spacing with "downstream" light-transmitting elements such as the quartz rods which receive light therefrom. A close, but non-contacting relationship is important to minimize heat loss and thereby maximize light-producing efficiency. The device of this invention provides excellent control of the quality of the light being generated, avoiding significant color variations.

The device of this invention is a light-generating/directing device of excellent compactness, which is highly useful in a number of lighting applications.

The light-generating/directing device of this invention may easily be replaced when replacement is needed. The device may conveniently be removed as a unit from a lighting apparatus and a new similar unit may conveniently be inserted in its place.

In preferred embodiments, each spring washer has a free (uncompressed) dimension and a fully-compressed dimension—i.e., a thickness or axial dimension. In the device the spring washers are held in compression. Most preferably, each spring washer is a wavy washer. Such compressible washers provide excellent suspension of the light-gathering/directing elements, a factor of considerable importance particularly when such elements are fragile quartz or the like.

In preferred embodiments, the outlet end of each light-gathering/directing element and the spring washer engaged therewith have particular characteristics facilitating the assembly and support. More specifically, each of the outlet ends has an edge with at least one notch and preferably several notches therein, and each spring washer a retaining tab engaged in each of the notches.

In certain preferred embodiments, the engagement of each spring washer with the annular washer-engaging surface of the corresponding cage member is facilitated by the shape of the cage member. More specifically, the walls of the cage members each have an inside surface with a recessed flange which itself forms the annular washer-engaging surface. The spring washers are received on such recessed flanges.

In preferred embodiments, the first and second cage members are held together by a securing member. Particularly preferred securing members are U-shaped spring clips which engage the first and second cage members. A pair of such securing members are preferably on opposite sides of the cage, each securing member being snap-engaged with the first and second cage members. An electrical connection mount is secured with respect to the cage, and most preferably is secured thereto by being attached to one of the securing members. The electrical connection mount has terminals thereon by which the lamp is electrically connected. The lamp is electrically attached to terminals on the terminal mount, and electrical power is brought to such mount by other terminals.

In preferred embodiments, the first and second cage members have abutting surfaces with mating alignment features thereon. In this way, the cage members can easily be placed in reliable alignment, appropriate for final assembly, without the securing member being in place to hold the cage members together. The cage is preferably substantially open-walled.

The light-gathering/directing elements are preferably generally tubular members each having an interior light-reflective surface for receiving light from the source at the inlet end and transmitting it to the outlet end. The tubular member preferably increases in cross-sectional area from its inlet end to its outlet end, and this reduce the angle of light reflected fro the interior surfaces thereof and helps limit the width of the beam which is directed therefrom. In the most highly preferred embodiments, the light-gathering/directing elements are compound parabolic collectors, preferably made of quartz.

In preferred embodiments, the inlet ends of the light-gathering/directing elements engage one another and each inlet end has an inlet edge with two spaced notches such that adjoining pairs of inlet edge notches provide openings for receiving portions of the lamp as it is in position between the light-gathering/directing elements.

Preferably, the device of this invention has mounting members secured to the cage to facilitate attachment to the lighting apparatus. Such mounting members are preferably in the form of spring clips at one end of the structure.

While this invention has been described thus far in a symmetrical form, the invention also involves non-symmetrical and unidirectional arrangements in which, e.g., there may be a single light-gathering/directing element.

BRIEF DESCRIPTION OF THE DRAWINGS

The drawings illustrate preferred embodiments which include the above-noted characteristics and features of the invention. The invention will be readily understood from the descriptions and drawings. In the drawings.

DETAILED DESCRIPTION OF PREFERRED EMBODIMENTS

Figure 1:
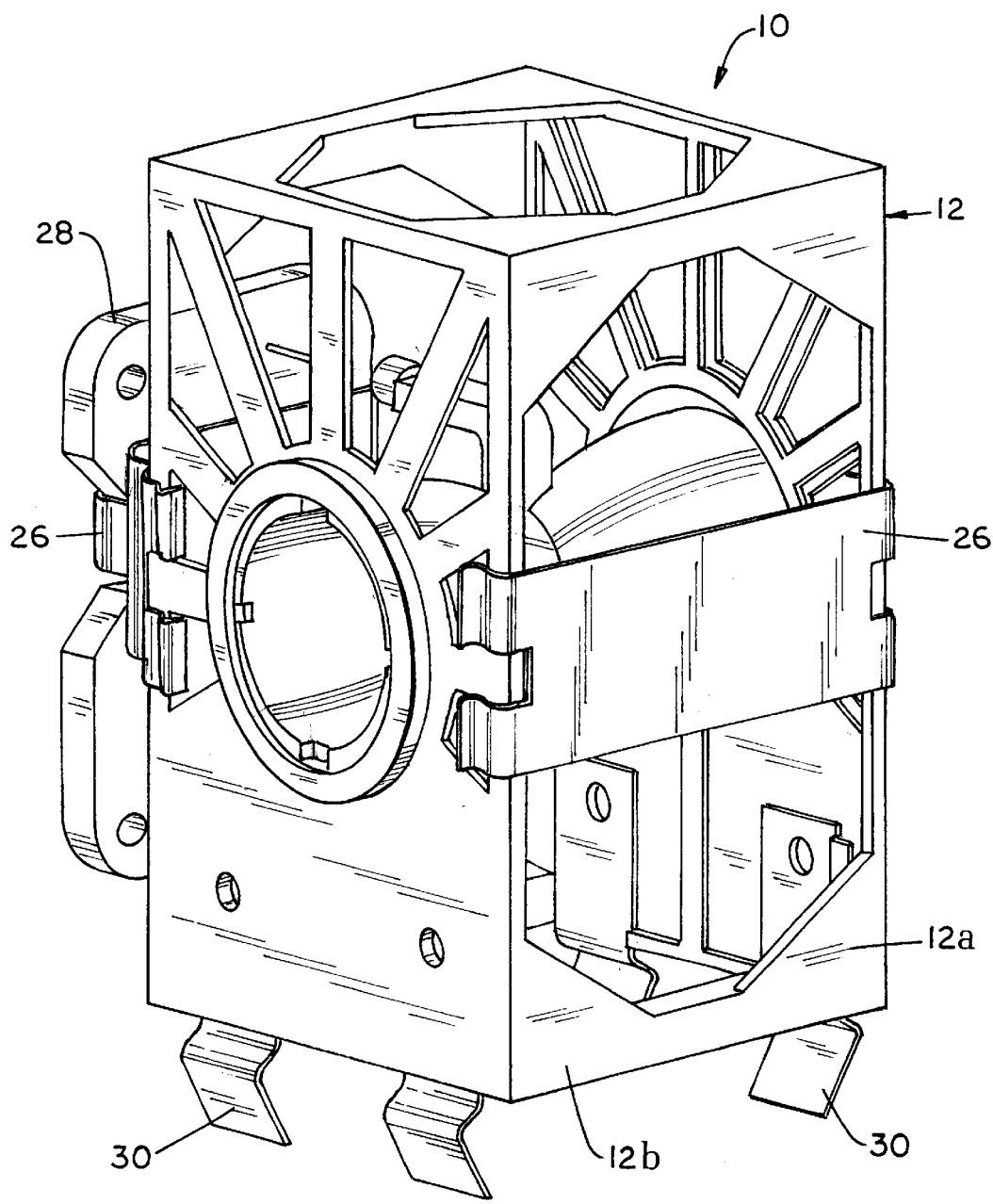
FIG. 1 is a perspective view of a preferred light-generating and beam-establishing device in accordance with this invention.
Figure 2:
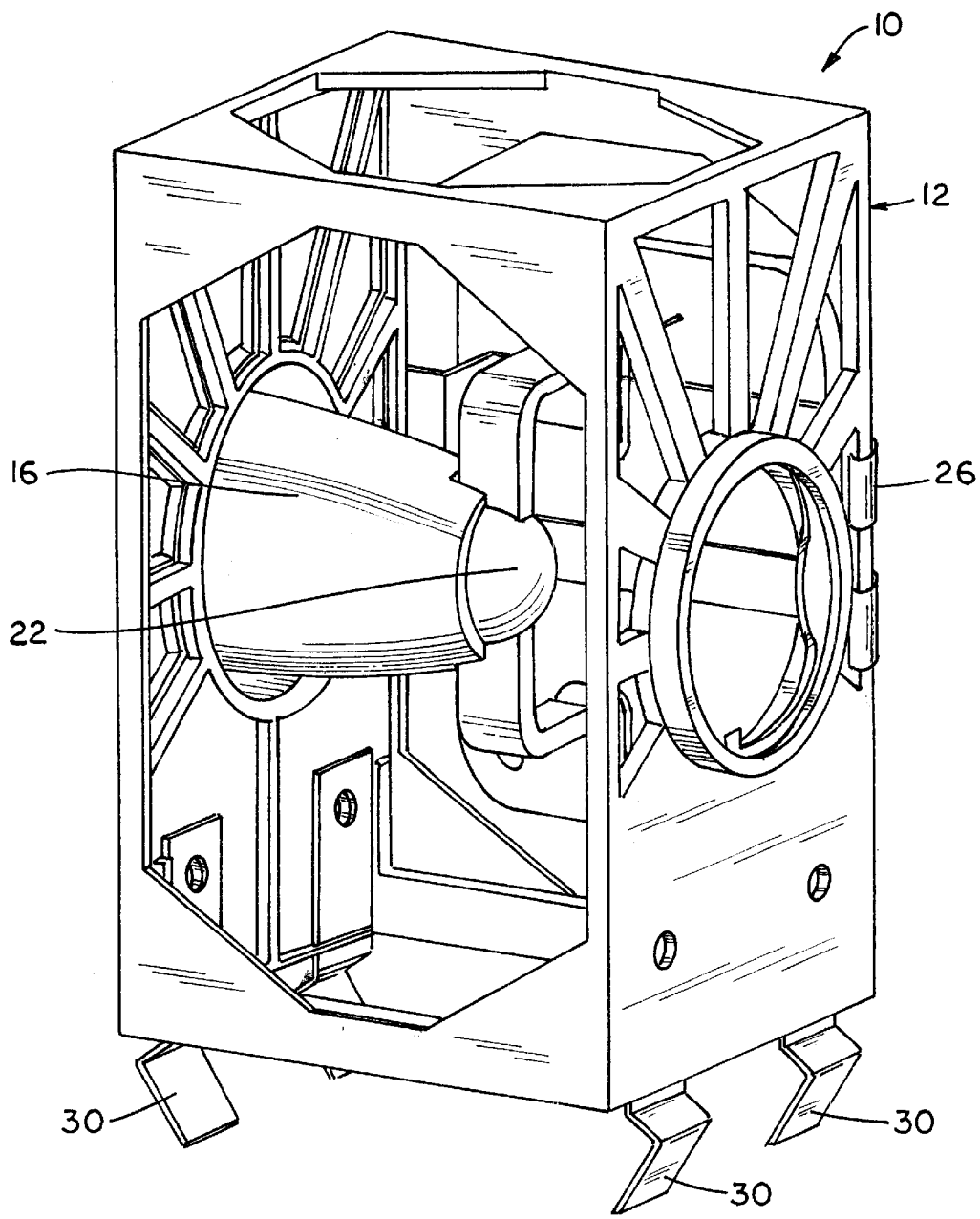
FIG. 2 is another perspective view from a different direction with one of the securing members and one of the light-gathering/directing elements removed to better illustrate certain parts.

The figures illustrate a highly preferred light-generating and beam-establishing device 10 in accordance with this invention. Device 10 is used for generating light and establishing two opposite, substantially co-linear light beams. This device maybe used in a variety of lighting products, including an apparatus for illuminating two well-defined limited areas.

Device 10 includes a cage 12 which is made up of first and second cage members 12a and 12b, a pair of tubular light-gathering/directing elements 16, a lamp 22, a pair of wavy spring washers 24, a pair of spring clips (securing members) 26, an electrical connection mount 28 and mounting members 30.

First and second cage members 12a and 12b each include a wall 14 which defines a light opening 14a surrounded by an inwardly-facing annular washer-engaging surface 14b. Each wall 14 has an inside surface with a recessed flange, also identified by 14b, forming annular washer-engaging surface 14b.

Light-gathering/directing elements 16 are made of quartz and are compound parabolic collectors in end-to-end relationship. Each light-gathering/directing element 16 has an interior light-reflective surface 16a, an inlet end 18 and an opposite outlet end 20. Lamp 22, which is also made of quartz and has a bulbous center portion for its arc elements, is between inlet ends 18 of the two light-gathering/directing element 16. Light-gathering/directing element 16 are positioned such that their outlet ends 20 are each aligned with a corresponding annular washer-engaging surface 14b. Each wavy spring washer 24 is located between and engaging each outlet end 20 and corresponding washer-engaging surface 14b.

Spring clips 26 engage cage members 12a and 12b, securing them together with light-gathering/directing elements 16 and wavy spring washers 24 sandwiched therebetween. Wavy spring washers 24 have a free dimension of about 0.065–0.078 inch and a fully compressed dimension of about 0.006 inch. When the device of this invention is assembled, wavy spring washers 24 are in compression such that the fragile elements of the assembly are reliably held in place without excessive force, this being accomplished in a manner accommodating significant manufacturing tolerances and assembly variations.

Figure 3:
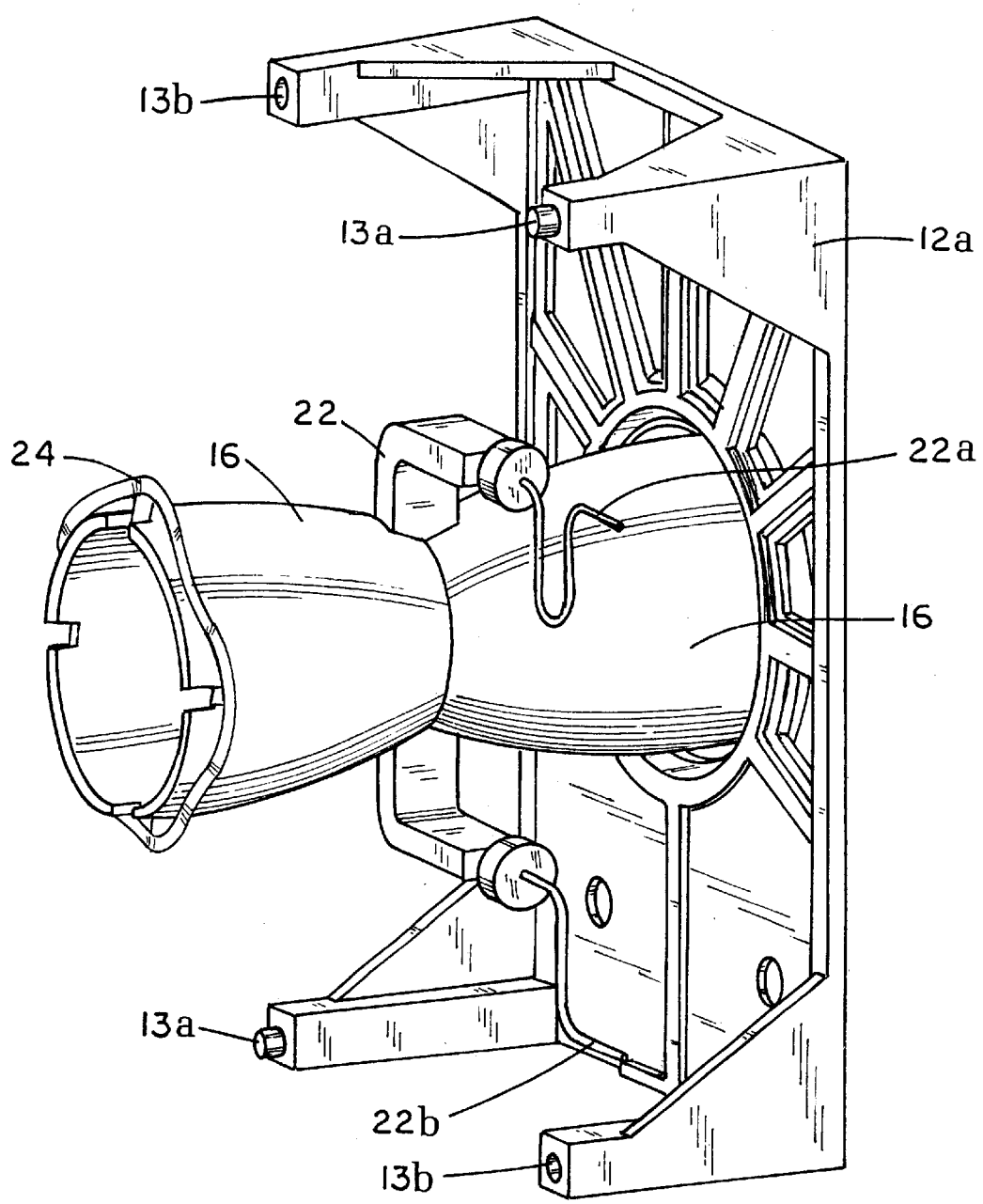
FIG. 3 is another perspective view of the device of FIG. 2 but taken from the direction of FIG. 1.
Figure 4:
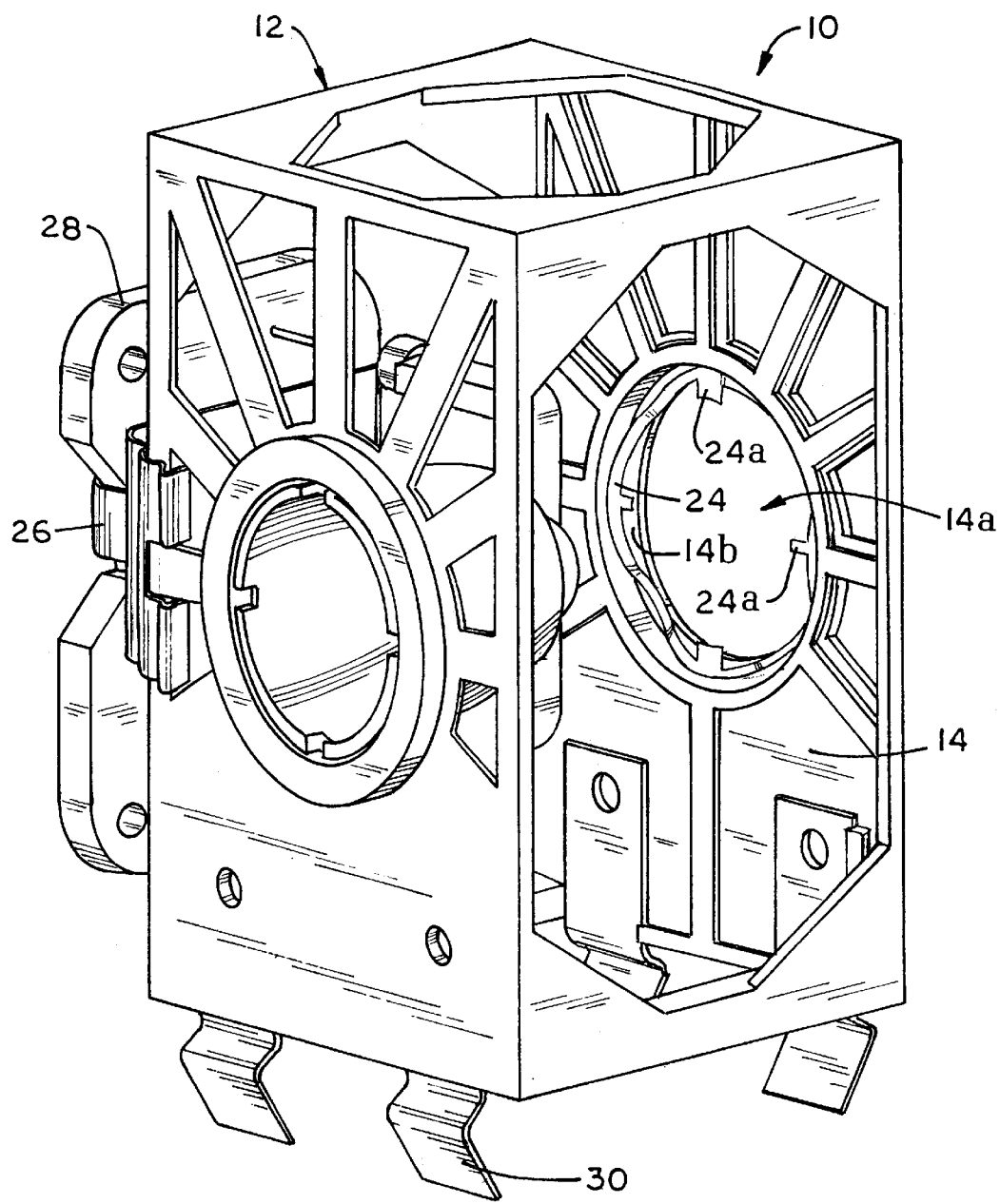
FIG. 4 is still another perspective view from the direction of FIG. 1 but with a substantial number of parts removed to better illustrate certain parts.
Figure 5:
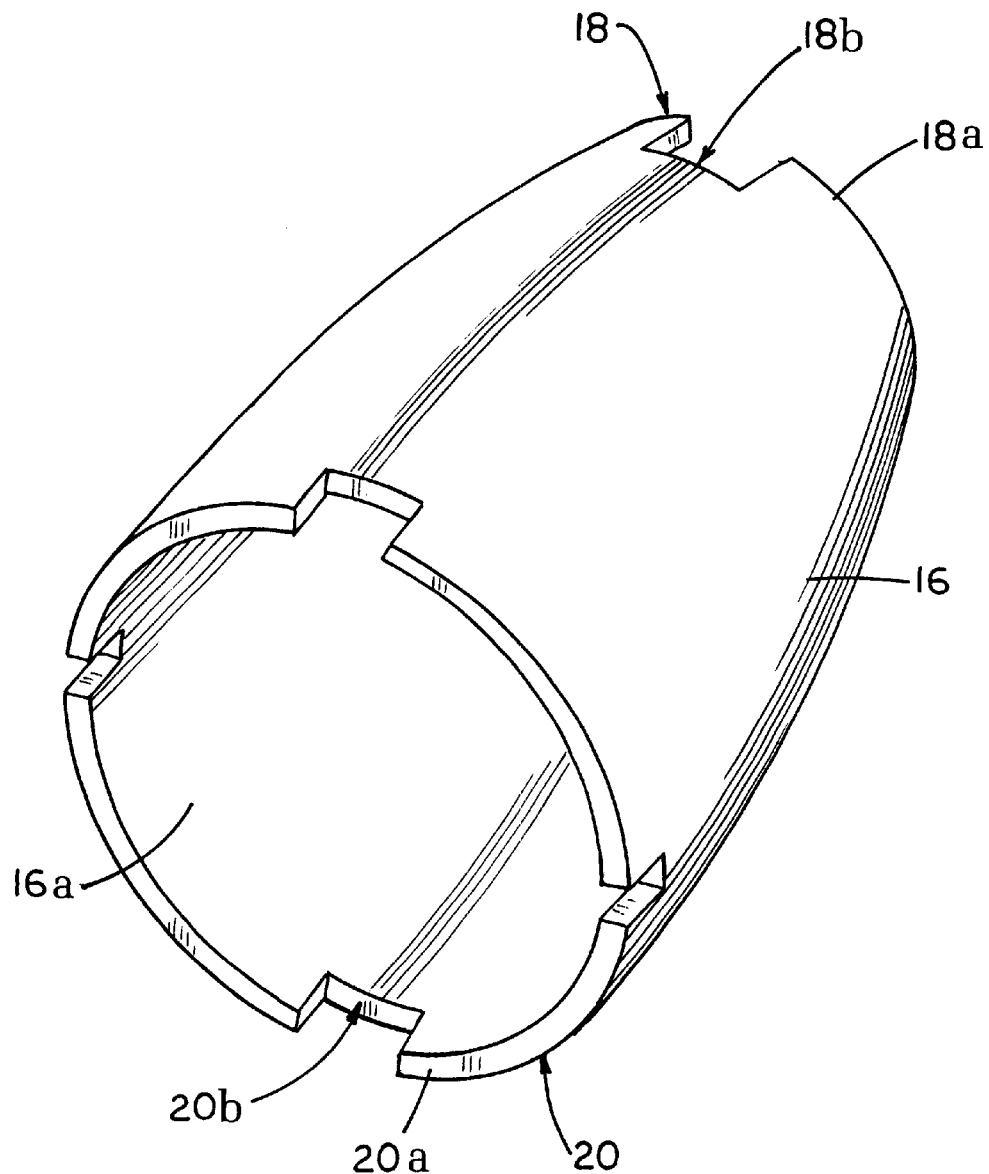
FIG. 5 is an enlarged perspective view of one of the light-gathering/directing elements.

As best illustrated in FIG. 5, outlet end 20 of light-gathering/directing element 16 has an outlet end edge 20a which has four notches 20b in it. Notches 20b are for the purpose of receiving inwarding-extending tabs 24a of wavy spring washer 24, which are best illustrated in FIGS. 3 and 4. Such engaging relationships facilitate the alignment and orientation of parts and the aforementioned in-compression assembly.

Spring clips 26, which are of U-shaped configuration, hold first and second cage members 12a and 12b together, and are snapped in place. Cage members 123a and 12b have openings to facilitate such snap-engagement. One of spring clips 26 is also used for securing electrical connection member 28 with respect to cage 12. Lamp 22 has leads 22a and 22b which engage terminals (not shown) on electrical connection mount 28. Electrical connection mount 28 also has terminals on its reverse side (not shown) for attachment of the power supply.

First and second cage members 12a and 12b have abutting surfaces with male and female mating alignment features 13a and 13b as illustrated in FIG. 4. Such features allow the cage members to be placed in reliable alignment before spring clips 28 are applied to hold the assembly together. Cage 12 is substantially open-walled.

Mounting members 30 are spring members designed to snap-engage corresponding features on the lighting apparatus with which device 10 is used. Such snap engagement facilitates removal and replacement of light-generating and beam-establishing device 10.

Cage members 12a and 12b are preferably made of aluminum, zinc or alloys thereof. Wavy spring washer 24 is preferably made spring steel, as are spring clips 26 and mounting members 30. Electrical connection mount 28 is preferably made of a ceramic material.

While the principles of this invention have been described in connection with specific embodiments, it should be understood clearly that these descriptions are made only by way of example and are not intended to limit the scope of the invention.

We claim:

1. A light-generating and beam-establishing device for lighting apparatus, the device comprising:
    a cage having first and second cage members, each cage member having a wall defining a light opening surrounded by an inwardly-facing annular washer-engaging surface;
    a pair of light-gathering/directing elements, each having an inlet end in end-to-end relationship with the inlet end of the other light-gathering/directing element and an outlet end aligned with one of the washer-engaging surfaces;
    a lamp between the inlet ends of the light-gathering/directing elements;
    a spring washer between and engaging the outlet end of each of the light-gathering/directing elements and the corresponding washer-engaging surface; and
    the first and second cage members being secured together with the light-gathering/directing elements and spring washers sandwiched therebetween.

2. The device of claim 1 wherein each spring washer has a free dimension and a fully-compressed dimension and is held in compression.

3. The device of claim 2 wherein each spring washer is a wavy washer.

4. The device of claim 2 wherein for each outlet end of the light-gathering/directing elements and the spring washer engaged therewith:
    the outlet end has an edge with at least one notch therein; and
    the spring washer has at least one retaining tab engaged in the notch.

5. The device of claim 4 wherein there are plural notches and plural tabs engaged therein.

6. The device of claim 5 wherein the spring washer is a wavy washer.

7. The device of claim 1 wherein the wall of each cage member has an inside surface with a recessed flange forming the annular washer-engaging surface, each such recessed flange receiving one of the spring washers.

8. The device of claim 1 wherein the first and second cage members are held together by a securing member.

9. The device of claim 8 wherein the securing member is a U-shaped spring clip engaging the first and second cage members.

10. The device of claim 8 wherein there are a pair of the securing members on opposite sides of the cage, each securing member being snap-engaged with the first and second cage members.

11. The device of claim 10 further comprising an electrical connection mount attached to one of the securing members and having terminals thereon, the lamp being electrically attached thereto.

12. The device of claim 1 further comprising an electrical connection mount secured with respect to the cage and having terminals thereon, the lamp being electrically attached thereto.

13. The device of claim 1 wherein the first and second cage members have abutting surfaces with mating alignment features thereon, whereby the cage members can readily be placed in reliable alignment without the securing member being in place on the cage members.

14. The device of claim 1 wherein the cage is substantially open-walled.

15. The device of claim 1 wherein each of the light-gathering/directing elements is a generally tubular member having interior light-reflective surface for receiving light from the source at the inlet end and transmitting it to the outlet end, the tubular member increasing in cross-sectional area from its inlet end to its outlet end thereby to reduce the angle of light reflected.

16. The device of claim 15 wherein each of the light-gathering/directing elements is a compound parabolic collector.

17. The device of claim 15 wherein the light-gathering/directing elements and the lamp are of quartz.

18. The device of claim 1 wherein:
the inlet ends of the light-gathering/directing elements engage one another; and
each inlet end has an inlet edge with two spaced notches whereby adjoining pairs of inlet edge notches provide openings receiving the lamp.

19. The device of claim 1 further comprising mounting members secured to the cage to facilitate attachment to the lighting apparatus.

20. A light-generating and beam-establishing device comprising:
a cage having first and second cage members, the first cage member having a wall defining a light opening with an inwardly-facing first washer-engaging surface thereabout, the second cage member having an inwardly-facing second washer-engaging surface;
a light-gathering/directing element having an inlet end and an opposite outlet end;
a lamp at the inlet end;
a first spring washer between and engaging the outlet end and the first washer-engaging surface;
a second spring washer engaging the second washer-engaging surface and providing support to suspend the inlet end within the cage; and
the first and second cage members being secured together with the light-gathering/directing element suspended therebetween.

* * * * *